United States Patent [19]

Nazarathy et al.

[11] Patent Number: 4,812,038
[45] Date of Patent: Mar. 14, 1989

[54] ADAPTIVE SELECTION OF OTDR TEST PARAMETERS AND THE FUSION OF DATA TAKEN FROM SUCCESSIVELY SHRINKING MEASUREMENT SPANS

[75] Inventors: Moshe Nazarathy, Mountain View; Steven A. Newton, Belmont; Scott H. Foster, LaHonda, all of Calif.

[73] Assignee: Hewlett-Packard Company, Palo Alto, Calif.

[21] Appl. No.: 5,993

[22] Filed: Jan. 21, 1987

[51] Int. Cl.⁴ .......................................... G01N 21/84
[52] U.S. Cl. .................................... 356/73.1; 364/579
[58] Field of Search ........................................ 356/73.1

[56] References Cited

U.S. PATENT DOCUMENTS

4,158,505 6/1979 Mathisen et al. ................. 356/323 X

*Primary Examiner*—Vincent P. McGraw
*Attorney, Agent, or Firm*—John A. Frazzini; Edward Y. Wong

[57] ABSTRACT

A method of dynamically changing the measurement window and operating parameters of the instrument, based on intermediate results, in order to minimize the total time required to make a complete measurement. Also, a method of combining partial results from sub-windows into a final result to be displayed that has not been corrupted by variation in system response due to time-varying operating parameters.

11 Claims, 6 Drawing Sheets

ADAPTIVE SELECTION OF OTDR TEST PARAMETERS AND THE FUSION OF DATA TAKEN FROM SUCCESSIVELY SHRINKING MEASUREMENT SPANS

BACKGROUND OF THE INVENTION

In the following discussion of the Figures, the first digit of a reference numeral to an element in a figure indicates the first figure in which that element is presented.

This invention relates in general to instruments for measuring the properties of optical fibers and relates more particularly to optical time domain reflectometers (OTDRs). In the OTDR, a laser provides pulses of light that are injected into an optical fiber under test to measure the impulse return function (i.e., the return signal for a single pulse) of the optical fiber. An optical detector converts the return signal into an electrical signal that is amplified, sampled at a succession of time $t_i$, and then converted by an analog-to-digital converter (ADC) to digital data.

An OTDR tests an optical fiber by launching one or more test pulses of light into an input end of the fiber and measuring the return signal produced by these test pulses at the input end of the fiber. Each pulse produces an impulse return function h(t), representing the magnitude of the energy incident on the detector as a function of time, having the general shape shown in FIG. 1. h(t) is an exponentially decreasing function that also includes some step drops, like step drops 11 and 12 in amplitude and may include some spikes like spike 13.

As a test pulse travels down the optical fiber, Rayleigh scattering produces an exponentially decreasing amplitude of the pulse. Some of this scattered light reaches the input end of the optical fiber to produce the measured return signal. It is this exponentially decreasing amplitude that produces the exponentially decreasing shape of the return function.

Discrete scattering centers produce step decreases in the amplitude of the test pulse that show up as step drops in the return signal. An important example of a discrete scattering center is a splice at which two optical fibers are joined end to end. The loss of energy by the test pulse can result from misalignment of the two ends that are joined at the splice and can also result from a difference in diameter of the two fibers. A scattering spike results if a discrete scattering center scatters a significant fraction of the test pulse back to the input end of the fiber. Depending on how the output end of the fiber is terminated, Fresnel scattering at the output end can produce a large spike at the end of the return signal. The locations of these discrete scattering centers is often of interest and determines which sections of the optical fiber are of particular interest when testing the fiber. A continuous section of the fiber that is of interest is referred to herein as a "window".

Because the return signal can be quite small, there exist OTDRs that inject a plurality of test pulses to produce the return signal (for example, see P. Healey, "Optical Orthogonal Pulse Compression by Hopping", Electronics Letters 17, 970-971; or P. Healey, "Pulse Compression Coding in Optical Time Domain Reflectometry", 7ECOC, Copenhagen, Denmark, September, 1981; or copending U.S. patent application Ser. No. 935,661 entitled "Spread Spectrum Optical Time Domain Reflectometer" filed by Moshe Nazarathy, et al on Nov. 26, 1986. These test pulses each produce an associated return signal. When these test pulses are closely spaced, their associated return signals will overlap as illustrated in FIG. 2B for a test signal defined by an eight bit Golay code (shown in FIG. 2A).

Figure 1:
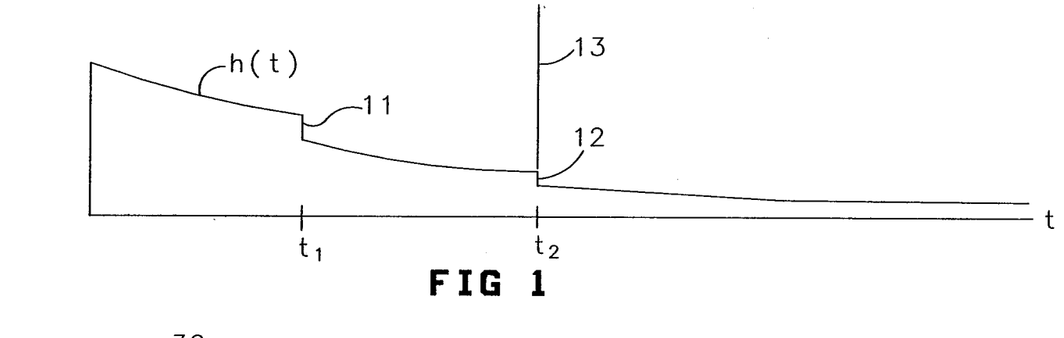
FIG. 1 illustrates a typical impulse response function.
Figure 2A:
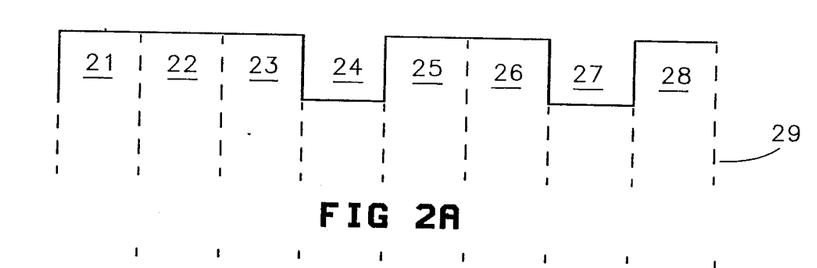
FIG. 2A presents a representative shot used to test an optical fiber.
Figure 2B:
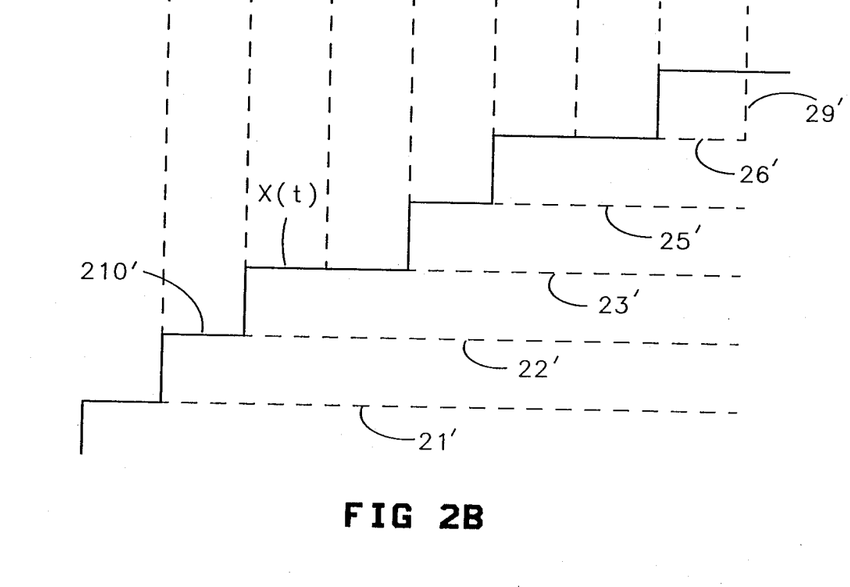
FIG. 2B illustrates buildup of the amplitude of a shot return function x(t) corresponding to the shot in FIG. 2A when the pulses in the shot are closely enough spaced that the impulse response functions, for the pulses in the shot, overlap.

The impulse return function in FIG. 1 has a decay time on the order of milliseconds and the pulses in FIG. 2 have a width on the order of microseconds. Thus, on the time scale in FIG. 2, the portion of h(t) in FIG. 2B produced by a corresponding pulse in FIG. 2A is substantially constant over the time scale in FIG. 2. In FIG. 2A, the eight bit code has six bits (bits 21-23, 25, 26 and 28) of unit amplitude and 2 bits (bits 24 and 27) of zero amplitude. Thus, the measured return signal x(t) represented by curve 210', is a superposition of impulse return functions produced by each of the nonzero bits in FIG. 2A. Thus, pulses 21-23, 25, 26 and 28 produce the overlapping impulse return functions 21'-23', 25', 26' and 28'. These combine to produce the measured return function x(t). At point 29, the buildup is complete and the general exponential decay becomes apparent.

At the end of each set of test pulses is a "dead time" in which no further test pulses are injected into the fiber. This dead time allows the return signals for one set of test pulses to end before a subsequent return signal is generated by the next set of test pulses. Each set of test pulses plus its subsequent dead time is referred to as a "shot" and the measured return function produced by a shot is referred to as the "shot return function". Various patterns of test pulses are utilized to enable the impulse return signal h(t) to be extracted from the measured return signal x(t). In the copending patent application by Nazarathy, et al, cited above, at least two types of shots need to be transmitted—each type is encoded according to one of the codes in a Golay pair. Each of these types of shots produces an associated shot return function. By measuring both types of return functions, the impulse return function h(t) can be extracted from both types of x(t).

Unfortunately, the amplitude of the shot return signal can exceed the dynamic range of the OTDR. Therefore, a method of selecting new OTDR operating parameters and splicing together the partial results is needed that enables the production of an output display of data within a time period that is acceptable to a typical OTDR user.

SUMMARY OF THE INVENTION

Figure 3:
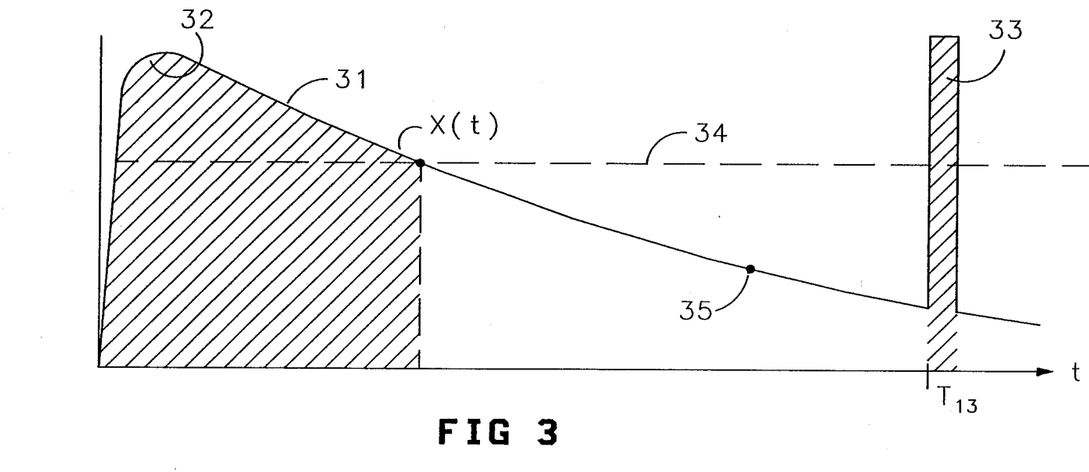
FIG. 3 shows the shape of a typical shot return function.

In FIG. 3 is shown the general shape of the shot return function 31 on a time scale much smaller than in FIGS. 1 and 2. Typically, the pulse width will be on the order of a microsecond and the shot duration will be on the order of the exponential decay time of h(t) (typically on the order of a millisecond). There is an initial buildup of the amplitude of the shot return function x(t) (represented by curve 31) due to the overlap of the large amplitude portion of the individual impulse return functions that overlap to produce the shot return function. This initial buildup produces a peak 32 that is followed by a generally exponentially decreasing region reflecting the generally exponentially decreasing behavior of the return functions for the individual test pulses.

A spike 13 in h(t) will show up in shot return function 31 as a tall spike return function 33 of duration equal to the duration $T_s - T_d$ where $T_s$ is the duration of a shot and $T_d$ is the duration of the deadtime at the end of the shot. Spike return function 33 is equal to the convolution of the shot (as a function of time) with a delta function representing the spike and is thus a replica of the code shown in FIG. 2A. The increased amplitude $A_p$ of pulse 33, above the amplitude of the return function just ahead of pulse 33, is equal to the height of spike 13 and therefore is not affected by the choice of the number N of pulses in a shot.

The inclusion of several pulses in a shot results in a shot return signal 31 having a maximum amplitude that is much larger than for the case of a single pulse shot. This increased amplitude can result in the maximum amplitude of the measured shot return signal x(t) exceeding the dynamic range of the OTDR. This makes the measured data inaccurate for the portion of the return signal for which the OTDR range is exceeded. This overflow of the dynamic range of the OTDR can be avoided by reducing the number of pulses per shot and/or by decreasing the energy per pulse. However, such reductions decrease the energy carried per shot and thereby reduce the signal to noise ratio of the resulting measured single pulse return function h(t). This at least partially defeats the reason for including multiple pulses in a shot.

The dynamic range of the OTDR is represented by horizontal dashed line 34. The data is faulty at any points of x(t) at which curve 31 exceeds dashed line 34. Such faulty data is highlighted as cross-hatched sections of x(t).

Since each point of h(t) corresponds linearly to a point in the optical fiber, a window in the optical fiber corresponds to an associated window in h(t). Measurement of a window located near the input end of the optical fiber can require that a reduced pulse amplitude and/or a reduced number of pulses per shot be utilized in order to avoid exceeding the dynamic range of the OTDR. This means that each shot will inject a reduced amount of energy into the fiber per shot and will thereby increase the amount of time required to get an acceptable signal to noise ratio (SNR) throughout an entire window of interest. Since the amplitude of the return signal is larger for a window nearer the input end of the fiber, such a window will have a better SNR than a window located farther away from the input end. To get an acceptable SNR for windows farther away from the input end, a greater number of measurements are required than for a window nearer to the input end. In order to reduce the time needed to make the additional measurements of these more distant windows, it is advantageous in measuring data in those windows to utilize shots having a greater amount of energy than the shots used for the closer windows.

In accordance with the illustrated preferred embodiment of the invention, a process is presented that avoids exceeding the dynamic range of the OTDR by measuring successively decreasing subwindows of the window of interest under various operating conditions of an OTDR. The data in these subwindows is fused in a way that does not introduce spurious results. The OTDR operating parameters are selected in each subwindow to maximize the energy per shot without exceeding the dynamic range of the OTDR.

When OTDR parameters, such as the amplitude of pulses injected into the fiber and the number N of pulses per shot, are varied between measurements, changes in the baseline and in the gain of the OTDR will introduce such spurious results. This is particularly true because of the large range in the amplitude of the measured return signal x(t). The baseline drift can be on the order of millivolts and the return signals in the more distant windows can be on the order of microvolts, so that small amounts of drift can introduce extremely large effects in distant and even midrange windows. Unless other measures are taken to eliminate the effect of such drift, this change in baseline can significantly affect the measured data. To a certain extent, these baseline drift errors can be controlled by judicious selection of pulse codes and subsequent signal processing. However, there will always be some residual error in the form of uncertainty of at least the overall gain of the measurement as operating parameters are varied. Therefore, data produced in sets of measurements in which the OTDR operating parameters differ in the different sets are patched together using one or more curve fitting parameters that are optimized to correct for changes in OTDR response under the different parameter settings.

Before displaying the data at each value of i, the data in the jth set of measurements is adjusted to account for variation in the OTDR response for the different operating parameter choices. These correction functions each have one or more parameters that are selected to optimize fitting together the data from different measurement sets.

In the following, $h^{jk}{}_i$ represents the measured value of h at the ith time $t_i$ for the kth measurement in the set of measurements for the jth set of operating conditions. The output value $O_i$ of the OTDR, representing the average of the adjusted measurements is equal to:

$$O_i = \sum_{i,j} A^j(a_1, \ldots a_{m_j}, h^{jk_i}) \tag{1}$$

where $A^j$ is the adjustment function for the data collected using the jth set of OTDR operating parameters, the $a_l$ are parameters of the parameters that are optimized to minimize any distortion introduced by patching together data collected under different operating parameters of the OTDR and $m_j$ is the number of these parameters for the jth set of operating parameters.

In general, the $A^j$ and $m_j$ will be identical for each value of j, but the values of the the $a_l$ for each $A^j$ will in general differ and will each be chosen to produce the best fit of data for different operating parameters. In the preferred embodiment, the $A^j$ all have the form:

$$A^j(G_j, B_j, h^{jk}{}_i) = G_j h^{jk}{}_i + B_j \tag{2}$$

where $G_j$ represents an adjustment for gain of the OTDR and $B_j$ represents an adjustment for the baseline of the OTDR.

In order to select values for $G_j$ and $B_j$, at the beginning of the jth set of data (for j > 1) is a subwindow of width $W^j$ that contains good data for both the jth and (j−1)th sets of data. The values of $G_{j-1}$ and $B_{j-1}$ are selected to produce the best fit of data in this window between the curve representing the average of the data in the jth set of measurements and the curve representing the average of the data in the (j−1)th set of measurements. From statistical analysis, there are several known norms used to measure best fit of data. One of the most common is the least squares norm in which the curve fit error is:

$$\sum_{i,j}[(G^j h^{j_i} + B^j) - (G^j h^{(j-1)i} + B^{j-1})]^2 \tag{3}$$

This error is then minimized as a function of both the $G^j h^j_i$ and the $B^j$. The actual output from the OTDR used the values of $G^j h^j_i$ and $B^j$ that minimize equation (3).

DESCRIPTION OF THE PREFERRED EMBODIMENT

In the OTDR, a laser provides pulses of light that are injected into an optical fiber under test to measure the impulse return function of the optical fiber. An optical detector converts the return signal into an electrical signal that is amplified, sampled at a succession of times $t_i$, and then converted by an analog-to-digital converter (ADC) to digital data. The binary data $x_i$ represents the value of shot return function x(t) at the ith measurement time $t_i$. If the range of the ADC is exceeded, it sets an overflow flag. The OTDR tests to see if an overflow flag is set during the measurement window and, if it is, then a new set of parameters are selected to try to avoid such overflow.

FIG. 3 illustrates the general shape of a typical shot return function. As can be seen in that figure, the shot return function has its greatest amplitude at points corresponding to discontinuities in the fiber and at peak 34 resulting from the buildup of overlapping impulse return functions from the pulses in the shot. There are three qualitatively different ways that the shot return function 31 can exceed the dynamic range of the OTDR in the measurement window. The condition of exceeding the dynamic range of the OTDR will also be referred to herein as an overflow condition, because it typically involves overflowing the range of the OTDR analog-to-digital converter.

Figure 9A:
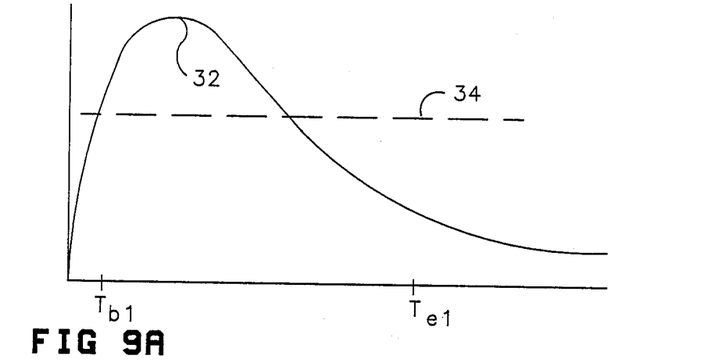
FIGS. 9A-9C illustrate three qualitatively different ways in which the dynamic range of the OTDR can be exceeded by a shot return signal.

In the first way of producing an overflow condition, illustrated in FIG. 9A for a window from time $T_{b1}$ to $T_{e1}$, the window includes peak 32 of the shot return function and the amplitude of this peak exceeds the dynamic range (indicated by dotted line 34) of the OTDR. Since the height of this peak increases both with an increase in the amplitude of the pulses in the shot and with an increase in the number N of pulses in the shot, one or both of these parameters can be reduced to try to eliminate the overflow condition. However, because a different choice of code length also means a different choice of code, the new code pattern will have a new number of nonzero pulses in a pattern that does not lead to a mere rescaling of peak 32. Therefore, it is not easy to predict the exact response on peak 32 of a new choice of code.

Figure 9B:
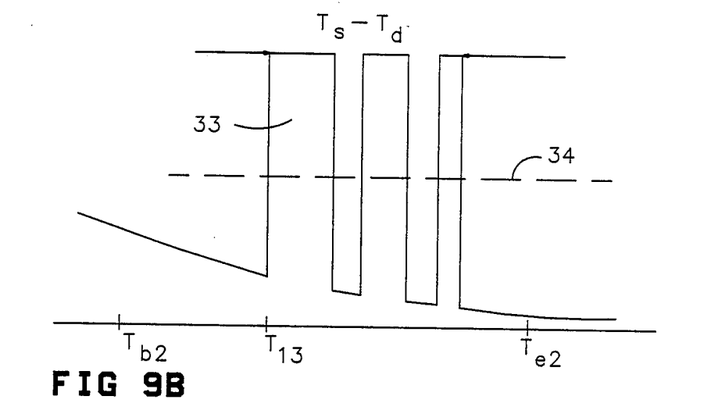

In the second way, illustrated in FIG. 9B by the choice of window from time $T_{b2}$ to $T_{e2}$, the spatial window in the fiber includes a discontinuity that produces a spike, such as spike 13 in FIG. 1, that exceeds the dynamic range of the OTDR. This spike in the impulse return function results in a corresponding spike return function in the shot return function (e.g., pulse 33). The incremental amplitude $A_p$ of this pulse above the adjacent points in the shot return function is unaffected by the choice of code length. Thus, the overflow condition is best eliminated by attenuating the test signal pulses.

Figure 9C:
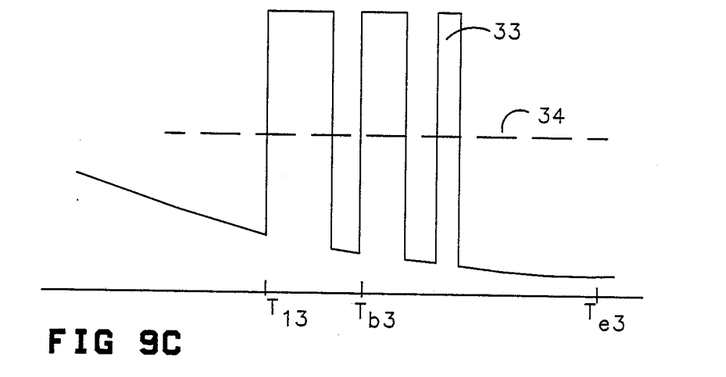

In the third way, illustrated in FIG. 9C by the choice of window from $T_{b3}$ to $T_{e3}$, the spatial window in the fiber does not include such a spike, but the discontinuity producing such a spike is located close enough to the beginning of the spatial measurement window that its corresponding spike return function in the shot return function extends into the temporal measurement window. That is, the beginning of the spike return function, $T_{l3}$ occurs before the measurement window, but, because this spike return function has a duration $T_s - T_d$, the spike return function overlaps into the measurement window. Such an overflow condition might also be eliminated by attenuating the test signal pulses. However, although the code length does not significantly affect the amplitude of the pulse 33, it does affect the width $T_s - T_d$ of that spike return function. Thus, it is possible that shortening the code length will shorten the code pulse enough that it ceases to overlap into the test window. Since attenuating the test signal can help avoid all three ways of exceeding the dynamic range of the OTDR, but shortening the code length will not help in the second situation discussed above, it is generally best to use attenuation first to try to eliminate an overflow condition.

In addition to attenuating the test signals, the amount of amplification of the output of the detector can be reduced to try to avoid the overflow condition. However, the gain should not be reduced below the level at which the noise voltage presented to the ADC is on the order of or larger than the voltage corresponding to a 1 bit change in the ADC output. If the gain is reduced below this level, the digital measurement process will introduce quantization noise into the measurements. This occurs because, in this embodiment, the ADC produces data of only 8 bits accuracy, but the data is averaged in a 32 bit memory. When the noise is greater than the least significant bit of the ADC, the output of the ADC for a given level of amplifier output signal will, in different measurements of that output signal, produce different digital values. The average of these values in the 32 bit memory will produce a more accurate measurement of the output signal than any one of the digital values from the ADC.

Figure 4A:
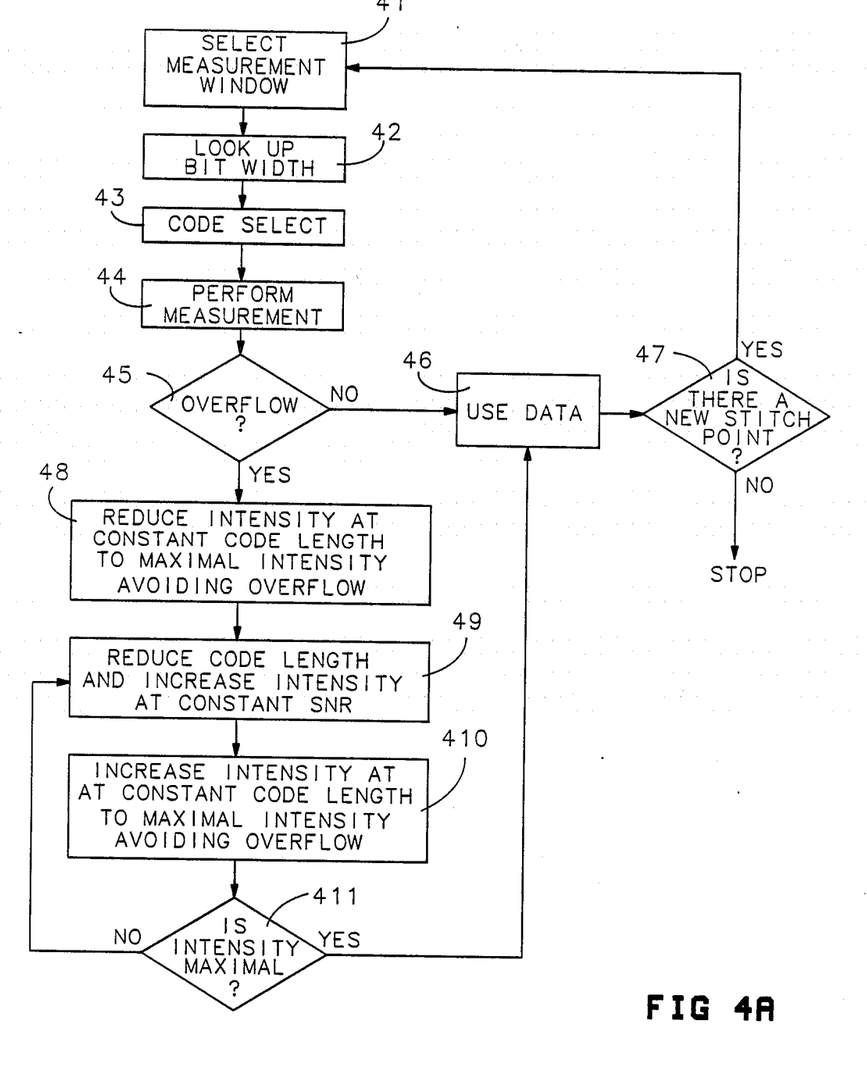
FIGS. 4A and 4B is a flow diagram of the steps used to select successively smaller windows for measurement of data and the OTDR parameters to be utilized in testing the fiber in such windows.
Figure 4B:
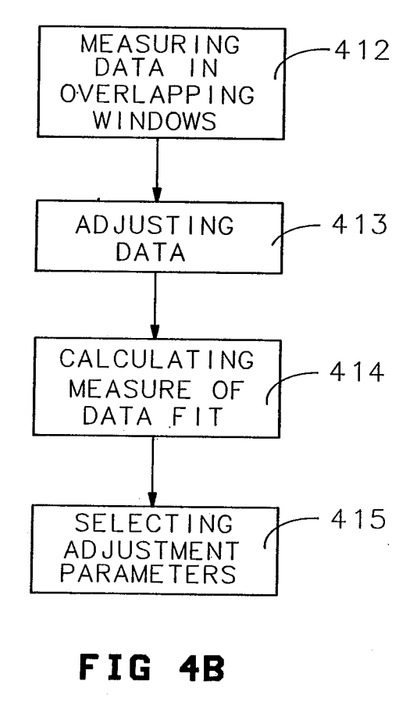

In FIG. 4 is presented a flow diagram of the steps used to select successive measurement windows for a given optical fiber window of interest. In step 41, the begining point $L_b$ and the end point $L_e$ of the spatial window of interest in the optical fiber are chosen. For a given point in the fiber at a distance D from the input end of the fiber and for a single pulse launched at time $t=0$, the response from that point will be detected at time $t(D)=2D/v$ where v is the speed of propagation of the pulse in the optical fiber. Thus, there is a 1-1 correspondence between a spatial window of interest in the fiber and an interval of the temporal impulse return function h(t). In a typical optical fiber, the two-way propagation speed is about $2*10^8$ m/s. This means that each 100 m section of the fiber corresponds to a 1 microsecond interval in the temporal display of h(t) in the output display of the OTDR.

Figure 5A:
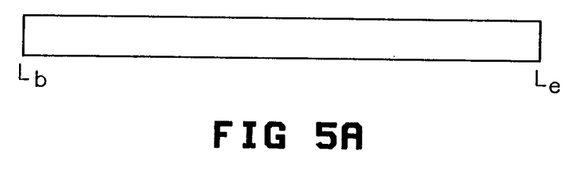
FIG. 5 illustrates the correlation between the choice of window in the fiber with the choice of window measured in the shot return function x(t).
Figure 5B:
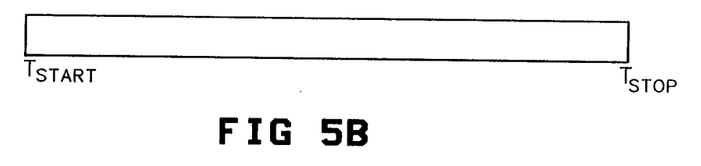

When a shot contains more than one pulse, the shot return function will contain information about the point at distance D over the interval from $t=2D/v$ to $t=2D/v+T_s-T_d$ where $T_s$ is the duration of a shot and $T_d$ is the deadtime at the end of a shot. Thus, for a window of interest in the fiber from $L_b$ to $L_e$, the window of interest for x(t) extends from a start time $T_{start}$ equal to $2L_b/v$ to a stop time $T_{stop}$ equal to $2L_e/v+T_s-T_d$ (see FIG. 5(b)). The window of data displayed on the output display of the OTDR will extend from $T_{start}$ to $2L_e/v$.

Figure 6:
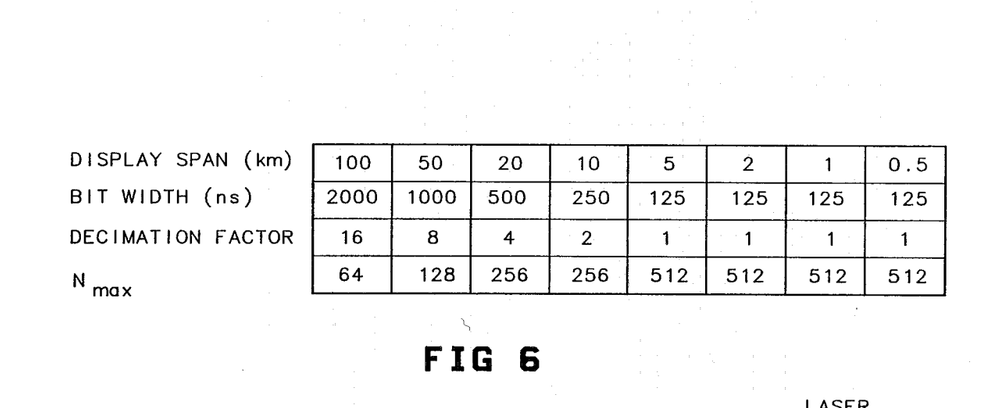
FIG. 6 is a table that enables the choice of the pulse width $T_p$ and the maximum number $L_{max}$ of pulses allowed in a shot.

In step 42 of FIG. 4, the bit width is selected by looking up in the table in FIG. 6 the bit width corresponding to the smallest display span that is larger than the choice of $L_e-L_b$. By a "bit" is meant the smallest section of a shot whose polarity is determined by a corresponding bit in the pseudorandom code defining the pattern of the shot. The bit width BW is determined by use of the table presented in FIG. 6. The smallest bit width in this table is equal to the clock period which is determined by the technology used to implement the OTDR. In this embodiment, the minimum bit width is 125 ns. Because of the 1:1 correspondence between a spatial window of interest in the fiber and the temporal return function, if $N_d$ points are to be displayed on the output of the OTDR, then the ideal duration of a bit for a given measurement range span $L_e-L_b$ is $(L_e-L_b)/(v*N_d)$. For $N_d=500$ points, if the maximum range tested (i.e., display span) is 100 km, then the maximum bit width is 2,000 ns.

It is conventional to select range values at integral powers of 10 times a factor 1, 2 or 5. Therefore, this convention is followed in the choice of display span values in FIG. 6. For successively smaller display spans in this table, the bit width is reduced by the factor ½ until the minimum bit width is reached. The bit width is decreased by a factor of ½ each time the range decreases by a factor ½ or ½·5 in order to keep substantially constant the number of displayable points. This choice also constrains the size of memory needed to store measured data.

The sampling period is selected to be equal to the clock period of 125 ns. Thus, in a bit of width 2,000 ns, 16 measurements of x(t) will be taken. These 16 measurements are digitally averaged to produce a more accurate result than if x(t) were measured only once per test bit. The number of samples taken per bit is referred to in FIG. 6 as the decimation factor DF.

In general, the bit width values in FIG. 6 are each some integral power of 2 times the shortest bit width. For successively smaller values of $L_e-L_b$, each of which is either ½ or 2/5 the previous value, the decimation factor decreases by a factor of 2 until it reaches the value 1. For even smaller values of $L_e-L_b$, the decimation factor is held constant at 1.

In step 43, the maximum allowable code length $N_{max}$ is determined by reference to the table in FIG. 6 for the display window size chosen in step 41. Once these parameters have been selected, a single measurement is executed utilizing zero laser attenuation, maximum amplification of detector output, and a code of maximum code length $n_{max}$ for the choice of display span, so that the maximum energy per shot is transmitted in the first test shot. For example in FIG. 7, it is assumed that $N_{max}$ is $2^9$. Therefore, these initial parameters correspond to point 71 in FIG. 7. This measurement is made to determine if the parameter choice leads to overflow. If the range of the analog to digital converter in the OTDR is exceeded, the ADC sets an overflow flag.

The window of interest from $L_b$ to $L_e$ is measured by starting the recording of data at a time $T_{start}$ after launching the test code and stopping the recording of data after the time $T_{stop}$. If the overflow flag is set (step 45) during the temporal window of interest from $T_{start}$ to $T_{stop}$, then the measurement results are discarded and new choices of code length, laser attenuation and detector signal amplification are selected (in steps 48, 49, 410 and 411) to try to avoid such overflow.

Two ways are used to try to avoid this overflow: (1) the laser output is attenuated (step 48); or (2) the code length is shortened (step 49). These steps are illustrated in FIGS. 4A, 4B, and 7 for an embodiment in which the amplification of the detector output is kept constant.

Figure 7:
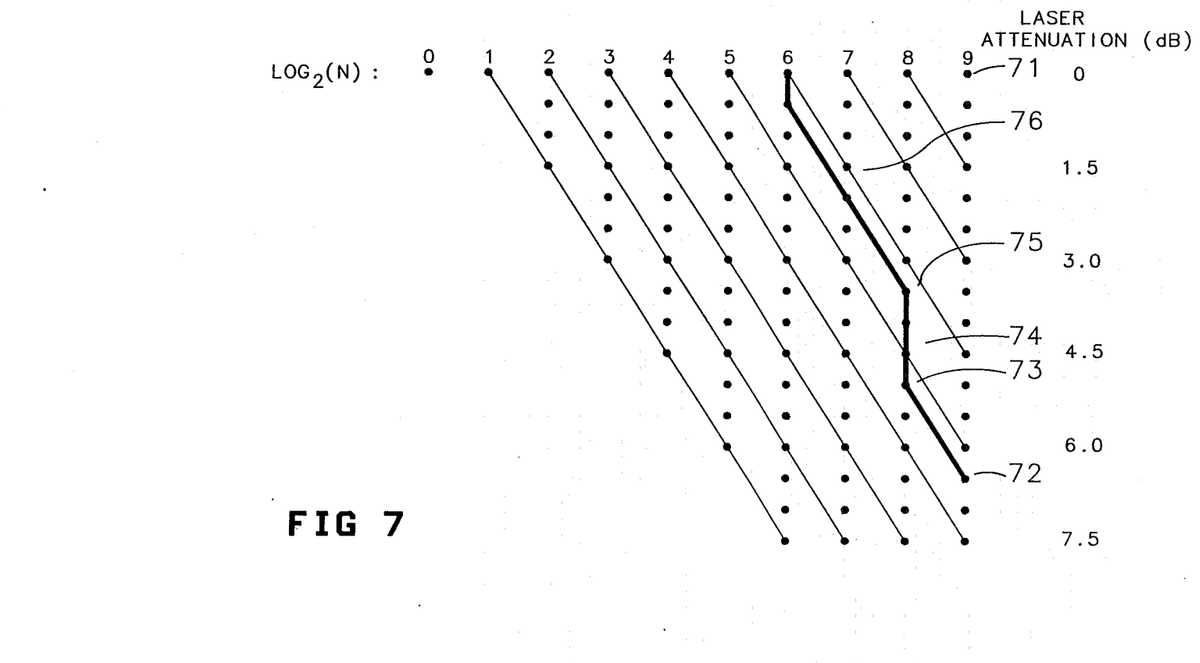
FIG. 7 is a table that enables the selection of the laser attenuation and code length N to be used in measuring x(t) in a selected window.

The diagonal lines in FIG. 7 represent lines of constant signal-to-noise ratio (SNR) per shot. The initial column used in FIG. 7 is determined by the code length $N_{max}$ selected above. In this example, the initial value of $N_{max}$ is $2^9$.

The optimal code length-attenuation combination could be found by testing the fiber with a single pulse for all of the choices in FIG. 7. However, to reduce this search, a more systematic approach is taken. Since shortening the code length will not significantly affect the height of spike return signals like spike return signal 33 in FIG. 3, but laser attenuation will reduce the remainder of the shot return signal, it is first attempated to reduce the overflow by attenuating (step 48) the laser for constant choice of code length. The maximum attenuation is utilized. If this eliminates the overflow, then a binary search within this column of constant code length is made to find the smallest amount of attenuation that eliminates such overflow. This choice of attenuation and code length is indicated as point 72. Once this point is known, it is known that an improvement in SNR can only be achieved in the triangular section of FIG. 7 above and to the right of the line of constant SNR passing through point 72 and to the left of the column for $\log_2(N)=9$. Thus, locating point 72 has already significantly reduced the time to find the optimized parameters.

The next choice of parameters is then selected by moving along a line of constant SNR per shot from point 72 to point 73 (step 49) in the column of next shorter code length and then upward by one increment of attenuation to point 74. Since there is no loss in SNR per shot along the line through points 72 and 73, all of the choices along this line are equally good from SNR considerations alone. However, along this line, the code length is reduced by a factor ½ and this may lead to a situation in which less attenuation can be employed with a net increase in the SNR. Point 73 therefore decreases the chance that overflow occurs because of the third way of producing overflow. If there is no overflow at this point, a binary search 74 (step 410) is made within the column of constant code length and within the range of smaller attenuation to find the point of minimum attenuation without overflow. This point is denoted as point 75. These steps are repeated until a point with zero attenuation is reached (step 411) or until it is found that movement leftward one column produces overflow. In this latter case, the previous choice having no overflow is used for measurement of the fiber.

When the optimal attenuation factor and code length are found, then, in step 44, a set of 256 shots are transmitted to measure, within the window selected in step 41, the shot return signal x(t) for each shot. This number of shots is used because it takes about ¼ second and this produces a delay between successive updates of the output display that is acceptable to the user. This set of shots can contain more than one type of shot. For example, in the copending patent application by Nazarathy, et al, mentioned above, a Golay code pair is used in which there are two types of shots for a given code length (one type for each code in the Golay pair). The shot return function is averaged for each type of shot during one of these sets of shots. A correlation technique is then used in step 44 to extract the impulse response function h(t) from this data. The data for h(t) is then added into a data memory to produce increasingly more accurate data on h(t) with each set of measurements.

When the OTDR is manufactured, its noise level is known from measurements. The OTDR keeps track of the parameter choices used to measure data. From this information and from the known noise level of the instrument, the OTDR determines the signal-to-noise ratio (SNR) of each point of data. Point 35 represents the smallest value of time within the measurement window at which the (SNR) of h(t) falls below a reference value that has been chosen. Typically, this level is determined by the smallest step change in h(t) that the user wants to be able to see and by the known noise level of the instrument. Since h(t) is a generally exponentially decreasing function, the data to the right of point 35 will also generally have a smaller SNR than is acceptable.

In order to improve the accuracy of the data to the right of point 35, the data collection window is reduced in step 47 to the interval from point 35 to $T_{stop}$ and an additional set of 256 measurements is executed. More data is collected in this window (step 412) than in the interval from $T_{start}$ to point 35, the data in these two windows needs to be patched together (steps 413–415). Therefore, point 35 is referred to as a patch point. In this reduced window, the amplitude will generally be much smaller than in the window from $T_{start}$ to point 35, therefore it may be possible to use less laser attenuation and/or to select a longer code length to increase the size of the shot return signal in this reduced window. Thus, as indicated by step 45 in FIG. 4, in addition to reducing the beginning of the measurement window to the patch point at point 35, the code length and attenuation is again selected.

When this second set of measurements is completed and the additional data (steps 413–415) on h(t) has been combined with previous data, it may be that the SNR situation at point 35 has now improved to the extent that point 35 (and possibly other points to the right of it) now have a satisfactory SNR for display. A new patch point (either point 35 or a point to the right of it) is then determined as done previously for point 35. Thus, in accordance with step 47, successive sets of measurements are performed (step 412) in successively decreasing measurement spans until all of the data in the display window has acceptable SNR. When the entire SNR level is acceptable, the measurement of the optical fiber is complete.

Figure 8:
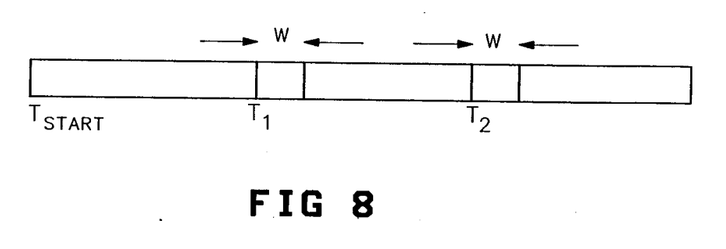
FIG. 8 illustrates patching together data produced by sets of measurements in which the operating parameters differ in the different sets.

Because different numbers of measurements are made within the various subwindows determined by the patching points and because the OTDR response can drift over the time intervals between successive sets of measurements and can vary for different choices of test parameters, the data in these subwindows needs to be adjusted (steps 413–415) to account for OTDR response variations within these different windows. This patching of data from the various subwindows is illustrated in FIG. 8 for the case of two patch points $T_1$ and $T_2$.

In order to patch the data, a display memory is utilized in addition to the data memory. At each patch point, a patch window of width W starting at that patch point is defined. When the start of the measurement window is increased from $T_{start}$ to the first patch point $T_1$, the data in the data memory is copied into the display memory.

Within the first patch window from $T_1$ to $T_1+W$, fewer test pulses were used in producing the data in the display memory than were used in producing the data in the data memory. Therefore, the data in the display memory from $T_1$ to $T_1+W$ is multiplied by a correction factor $G_1$. The factor $G_1$ corrects for the difference in the number of measurements in the patch window for the data in the display memory compared to the data in the data memory. This factor also corrects for drift in the gain of the OTDR between measurement sets and for changes in gain due to changes in code length and attenuator settings.

The value of $G_1$ is chosen to minimize the least squares fit error, within this patch window, between the data in the display memory and the data in the data memory. The data in the display memory from $T_{start}$ to $T_1$ is updated by use of these optimized correction parameter values. The data from $T_1$ to $T_{stop}$ is updated by replacement with the data in this same range in the data memory.

When the measurements in the reduced measurement window extending from $T_2$ to $T_{stop}$ are completed, the data within the second patch window are used to select parameter $G_2$. In the same manner as for the first patch window, an optimized value of $G_2$ is determined. This value is used to correct the data in the display memory from $T_{start}$ to $T_2$. The remainder of the display memory from $T_2$ to $T_{stop}$ is updated by replacement with the data in the data memory within that range.

We claim:
1. A method of selecting a code length of a test signal generated by a test instrument to test a device under test and of selecting an intensity of detected return signal produced in response to said test signal, said method comprising the steps of:
 (a) transmitting a coded test signal to the device under test
 and measuring, in an initial measurement window, a return signal from the device under test produced in response to the test signal;
 (b) determining whether an overflow of the measurement circuitry of the test device has occurred in step (a);

(c) if an overflow condition is detected, making a new selection of code length and intensity having a reduced energy per test signal; and (d) repeating step (c) until code length and intensity values are found that avoid overflow during step (b).

2. A method as in claim 1 wherein step (c) comprises the steps of:

(c1) reducing the intensity of the test signal for constant choice of code length to the largest value that avoids overflow; then (c2) reducing the code length while increasing the intensity such that the signal to noise ratio is substantially constant; and (c3) at the constant value of code length selected in step (c3), increasing the intensity for constant code length to the largest value that does not produce overflow.

3. A method as in claim 2 further comprising the step of repeating steps (c2) and (c3) until the intensity is the maximum test signal intensity that can be transmitted.

4. A method as in claim 1 further comprising before step (a) the step of:

(a0) selecting a measurement window for data points to be measured.

5. A method as in claim 4 further comprising, in response to the choice of measurement window in step (a0), between steps (a0) and (a) the steps of:

selecting a bit width for each bit in the coded test signal; and selecting the code for the coded test signal.

6. A method as in claim 5 wherein the bit width is an integral multiple M of a minimum sampling time for sampling a data point on the return signal and wherein, in step (a), the return signal is measured multiple times in the portion of the return signal corresponding to each bit of the coded test signal, said method further comprising the step of averaging the multiple measurements corresponding to each bit of the coded test signal.

7. A method as in claim 1 further comprising the steps of:

checking to see if any of the data has a signal to noise ratio between a selected reference level and, if there is such data, then selecting a new measurement window that is a subset of the previous measurement window and that contains data points that have signal to noise ratios below said reference level;

repeating steps (a–d) for said new measurement window; and patching together the data measured in each of these measurement windows.

8. A method as in claim 1 wherein the test signal has a controllable intensity and wherein the intensity of detected return signal is selected by controlling the intensity of the test signal.

9. A method as in claim 8 wherein the intensity of the detected return signal is controlled by attenuation of said detected return signal.

10. A method as in claim 7 wherein the step of patching together the data comprises the steps of:

adjusting the data in the jth window with an adjustment function having a set of parameters $a_{1j}, \ldots, a_{mj}$ for some integer $m_j$;

calculating a measure of the fit of data at the boundary between adjacent windows; and selecting the parameters of the adjustment functions to minimize this measure of the fit of the data.

11. A method as in claim 10 wherein the adjustment functions are of the form $$A^j(G_j, B_j, h^{jk}_i) = G_j h^{jk}_i + B_j$$

where the $G_j$ and $B_j$ are adjustment parameters for the jth window and the $h^{jk}_i$ is the value of the measured data at the ith data point in for the kth measurement in the jth window.

* * * * *